(12) United States Patent
Shan et al.

(10) Patent No.: US 7,824,768 B2
(45) Date of Patent: *Nov. 2, 2010

(54) CARBON FIBROUS STRUCTURE

(75) Inventors: Jiayi Shan, Tokyo (JP); Fuminori Munekane, Tokyo (JP); Takayuki Tsukada, Tokyo (JP); Kazuhiro Osato, Tokyo (JP)

(73) Assignee: Hodogaya Chemical Co., Ltd, Tokyo (JP)

( * ) Notice: Subject to any disclaimer, the term of this patent is extended or adjusted under 35 U.S.C. 154(b) by 168 days.

This patent is subject to a terminal disclaimer.

(21) Appl. No.: 12/094,110

(22) PCT Filed: Nov. 17, 2006

(86) PCT No.: PCT/JP2006/322970

§ 371 (c)(1),
(2), (4) Date: May 16, 2008

(87) PCT Pub. No.: WO2007/058297

PCT Pub. Date: May 24, 2007

(65) Prior Publication Data

US 2009/0162636 A1 Jun. 25, 2009

(30) Foreign Application Priority Data

Nov. 18, 2005 (JP) ............................. 2005-334887

(51) Int. Cl.
*B32B 5/16* (2006.01)
(52) U.S. Cl. ....................... 428/370; 428/371; 428/372; 428/401; 428/408

(58) Field of Classification Search ................. 428/408, 428/370, 371, 372, 401, 402; 423/445, 448
See application file for complete search history.

(56) References Cited

U.S. PATENT DOCUMENTS

| 5,643,670 | A * | 7/1997 | Chung | 428/367 |
| 6,686,311 | B2 * | 2/2004 | Sun et al. | 502/325 |
| 7,214,430 | B2 * | 5/2007 | Handa et al. | 428/408 |

FOREIGN PATENT DOCUMENTS

| JP | 57-117623 | 7/1982 |
| JP | 03-074465 | 3/1991 |
| JP | 2002-266170 | 9/2002 |
| JP | 2003-081621 | 3/2003 |
| JP | 2003-227039 | 8/2003 |
| JP | 2004-119386 | 4/2004 |
| JP | 2004-176244 | 6/2004 |
| WO | 2007-058297 | 5/2007 |

* cited by examiner

*Primary Examiner*—H. (Holly) T Le
(74) *Attorney, Agent, or Firm*—Sughrue Mion, PLLC

(57) ABSTRACT

Disclosed is a carbon fibrous structure which comprises a granular part and 2-20 pieces of carbon fibers each of which has an outside diameter of 15-100 nm and which are extend outwardly from the granular part, wherein the granular part is produced in a growth process of the carbon fibers, wherein the size of granular part is 1.3 or more of times larger than the outside diameter of the carbon fibers, and wherein the mean length of the carbon fibers is not more than 20 µm. The carbon fibrous structure improves the physical properties of the matrix, such as electric, mechanical, or thermal properties, while maintaining the other properties of the matrix, even when added at a small amount.

7 Claims, 7 Drawing Sheets

CARBON FIBROUS STRUCTURE

TECHNICAL FIELD

This invention relates to fine carbon fibrous structures, particularly, structures that are composed of fine carbon fibers wherein each of the fibers is composed of tubular laminates of fine carbon sheets and which are extended outwardly from a central granular part. The fibrous structures are suitable as additives to be added to solid materials, such as resin, ceramics, metal, etc., to improve physical properties, such as electric, mechanical, or thermal properties, of the solid materials, and also as additives to be added to liquid materials, such as fuels, lubricant oils, and etc., to improve physical properties, such as thermal property, of the liquid materials.

BACKGROUND ART

To date, carbon fibers have been used in various composite materials because of their good mechanical properties and high electric conductivity.

Recently, higher functionalities have come to be required for various materials. Additives which can improve physical properties, such as electric, mechanical, or thermal properties, of a matrix comprised of solid materials, such as resin, ceramics, and metal, without damaging the characteristics of the matrix have been sought after. Additionally, additives which can improve physical properties of liquids, such as fuels, oil, and lubricants have also been sought.

Incidentally, fine carbon fibers, such as carbon nano structures exemplified by the carbon nanotube (hereinafter, referred to also as "CNT"), have been attracting public attention in various fields.

The graphite layers that make up the carbon nano structures are materials normally comprised of regular arrays of six-membered rings whose structures can bring about specific electrical properties, as well as chemically, mechanically, and thermally stable properties. As long as such fine carbon fibers can retain such properties upon combining and dispersing into solid materials, including various resins, ceramics, metals, etc., or into liquid materials, including fuels, lubricant agents, etc., their usefulness as additives for improving material properties can be expected.

On the other hand, however, such fine carbon fibers unfortunately show an aggregate state even just after their synthesis. When these aggregates are used as-is, the fine carbon fibers would be poorly dispersed, and thus the product obtained would not benefit from the desirable properties of the nano structures. Accordingly, given a desired property such as electric conductivity for a matrix such as resin, it is necessary that the fine carbon fibers would be added in a large amount.

Patent Literature 1 discloses a resin composition comprising aggregates wherein each of the aggregate is composed of mutually entangled carbon fibrils having 3.5-70 nm in diameter, and wherein the aggregates possess a diameter in the range of 0.10 to 0.25 mm with a maximum diameter of not more than 0.25 mm. It is noted that the numeric data such as the maximum diameter, diameter, etc., for the carbon fibril aggregates are those measured prior to combining with a resin, as is clear from the descriptions in the examples and other parts of the Patent Literature 1. Patent Literature 2 discloses a composite material where a carbon fibrous material is added to the matrix, the carbon fibrous material mainly comprising aggregates each of which is composed of carbon fibers having 50-5000 nm in diameter, the mutual contacting points among the carbon fibers being fixed with carbonized carbonaceous substance, and each aggregates having a size of 5 μm-500 μm. In the Patent Literature 2, the numeric data such as the size of aggregate, etc., are those measured prior to the combining into resin, too.

Using carbon fiber aggregates such as described above, it is expected that the dispersibility of carbon nano structures within a resin matrix will improve to a certain degree as compared to that of using bigger lumps of carbon fibers. The aggregates prepared by dispersing carbon fibrils under a certain shearing force, such as in a vibrating ball mill or the like according to the Patent Literature 1, however, have relatively high bulk densities. Thus, they do not fulfill the need for ideal additives that is capable of improving various characteristics, such as electric conductivity, of a matrix effectively at minuscule dosages.

With respect to the carbon fibrous structure disclosed in the Patent Literature 2, it is necessary to provide an additional step for fixing carbon fibers at their mutual contacting points after synthesis of the carbon fibers, and thus the efficiency of manufacturing becomes worse. Further, since the carbon fibrous structure is manufactured by heating carbon fibers in a state such that mutual contacting points among the carbon fibers are formed by compression molding after synthesis of the carbon fibers, and wherein fixing of fibers at the contacting points is done by carbonization of organic residues primarily attached to the surface of the carbon fibers, or carbonization of an organic compound additionally added as a binder, the affixing forces at the contacting points are weak. In addition, the electrical properties of the carbon fibrous structures per se are not well, although a certain degree of improvement in the electrical properties would be expected as compared with the case of pulverized monofibrous carbon fibers. Thus, when these carbon fibrous structures are added to a matrix such as a resin, the carbon fibers fixed at the contacting points are easily detached from each other, and the carbon fibrous structures are no longer maintained in the matrix. Therefore, it is not possible to construct preferable conductive paths in a matrix such that good electrical properties may be conferred on the matrix by a small additive amount of the fibrous structures. Furthermore, when a binder is added to promote fixing and carbonization at the contacting points, fibers in the obtained fibrous structures would have large diameters and inferior surface characteristics because the added binder is attached to the whole surface area of the fibers rather than to a limited area on the contacting points.

Patent Literature 1: Japanese patent No. 2862578
Patent Literature 2: JP 2004-119386 A

DISCLOSURE OF THE INVENTION

Problems to be Solved by this Invention

Therefore, this invention aims to provide carbon fibrous structures which can improve the physical properties, such as electric, mechanical, or thermal properties, of a matrix while maintaining other properties of the matrix, when added to the matrix at a sufficiently small amount.

Means for Solving the Problems

As a result of our diligent study for solving the above problems, we, the inventors, have found that, in order to give sufficient improvements in properties even in a small adding amount, the effective things are to adapt carbon fibers having a diameter as small as possible; to make an sparse structure of the carbon fibers where the fibers are mutually combined tightly so that the fibers do not behave individually and which sustains their sparse state in the fluorine resin; and to adapt as the carbon fibers per se ones which are designed to have a minimum amount of defects, and finally, we have accomplished the present invention.

The present invention for solving the above mentioned problems is, therefore, a carbon fibrous structure which comprises a granular part and 2-20 pieces of carbon fibers each of which has an outside diameter of 15-100 nm and which are extend outwardly from the granular part, wherein the granular part is produced in a growth process of the carbon fibers, wherein the size of granular part is 1.3 or more of times larger than the outside diameter of the carbon fibers, and wherein the mean length of the carbon fibers is not more than 20 μm.

The present invention also provides the above mentioned carbon fibrous structure which has a bulk density of 0.0001-0.05 g/cm$^3$ Further, the present invention provides the above mentioned carbon fibrous structure which has an $I_D/I_G$ ratio of not more than 0.2, and an $I_{G'}/I_G$ ratio of 0.6-1.2, which are determined by Raman spectroscopy.

Furthermore, the present invention provides the above mentioned carbon fibrous structure which has a combustion initiation temperature in air of not less than 700° C.

Still further, the present invention provides the above mentioned carbon fibrous structure which is produced using as carbon sources of at least two carbon compounds, which have different decomposition temperatures.

In addition, the present invention provides the above mentioned carbon fibrous structure which is produced by creating a turbulent flow in a catalyst included raw material gas in a temperature range of 450-1000° C.

Further, the present invention provides the above mentioned carbon fibrous structure which is obtained by using as a precursor a carbon fibrous structure which comprises a three dimensional network of carbon fibers each having an outside diameter of 15-100 nm, and cutting the carbon fibers of the precursor at defect portions of the carbon fibers.

Effects of the Invention

According to the present invention, since the carbon fibrous structures are comprised of carbon fibers which each has a ultrathin diameter and which are bound together by a granular part produced in a growth process of the carbon fibers so that the concerned carbon fibers extend outwardly and three dimensionally from the granular part, the carbon fibrous structures can disperse promptly into a matrix such as a resin upon adding, while maintaining their bulky structure. Even when they are added at a small amount to a matrix, they can be distributed uniformly over the matrix. Therefore, with respect to the electric properties, it is possible to obtain good electric conductive paths throughout the matrix even at a small dosage, and thus it is possible to improve the electrical conductivity while maintaining a good transparency. With respect to the mechanical and thermal properties, improvements can be expected in analogous fashions, since the carbon fibrous structures are distributed evenly as fillers over the matrix with only a small dosage.

BRIEF DESCRIPTION OF THE DRAWINGS

FIG. [1A] is an optical micrograph of the carbon fibrous structure according to the present invention.

FIG. [1B] is another optical micrograph of the carbon fibrous structure according to the present invention.

FIG. [1C] is further another optical micrograph of the carbon fibrous structure according to the present invention.

FIG. [2A] is a TEM photo of the carbon fibrous structure according to the present invention.

FIG. [2B] is another TEM photo of the carbon fibrous structure according to the present invention.

FIG. [2C] is a further another TEM photo of the carbon fibrous structure according to the present invention.

FIG. [2D] is a still another TEM photo of the carbon fibrous structure according to the present invention.

FIG. [3] is a SEM photo of a precursor.

FIG. [4] is another SEM photo of a precursor.

FIG. [5] is a TEM photo of a carbon fibrous structure according to the present invention;

FIG. [6] is a schematic diagram illustrating a generation furnace used for synthesis of the precursor in a Synthetic Example.

FIG. [7] is an X-ray diffraction chart of the carbon fibrous structure according to the present invention, the precursor for the carbon fibrous structure, and a fibrous structure (intermediate).

FIG. [8] is Raman spectra of a carbon fibrous structure according to the present invention and the intermediate of the carbon fibrous structure.

FIG. [9] is an optical micrograph of a composite material where carbon fibrous structures according to the present invention are used.

EXPLANATION OF NUMERALS

1 Generation furnace
2 Inlet nozzle
3 Collision member
4 Raw material mixture gas supply port
a Inner diameter of inlet nozzle
b Inner diameter of generation furnace
c Inner diameter of Collision member
d Distance from upper end of generation furnace to raw material mixture gas supply port
e Distance from raw material mixture gas supply port to lower end of collision member
f Distance from raw material mixture gas supply port to lower end of generation furnace

BEST MODE FOR CARRYING OUT THE INVENTION

Now, the present invention will be described in detail with reference to some embodiments.

Figure 1A:
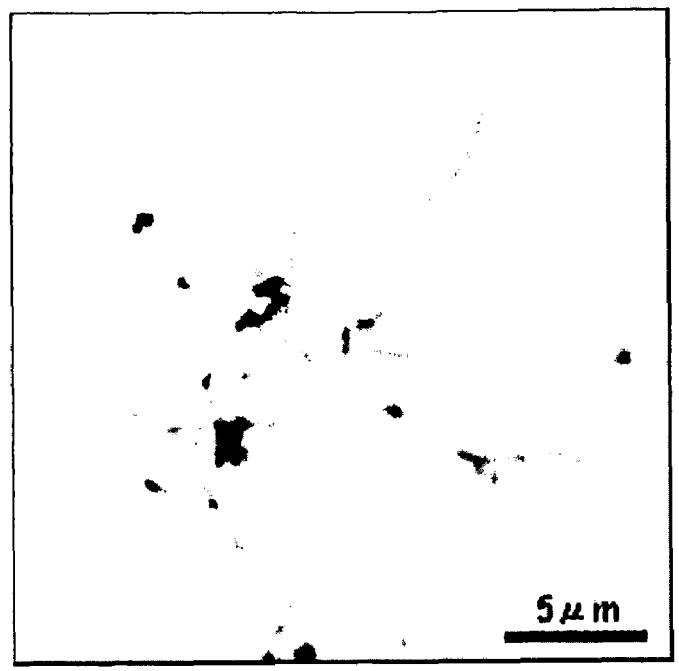
Figure 1B:
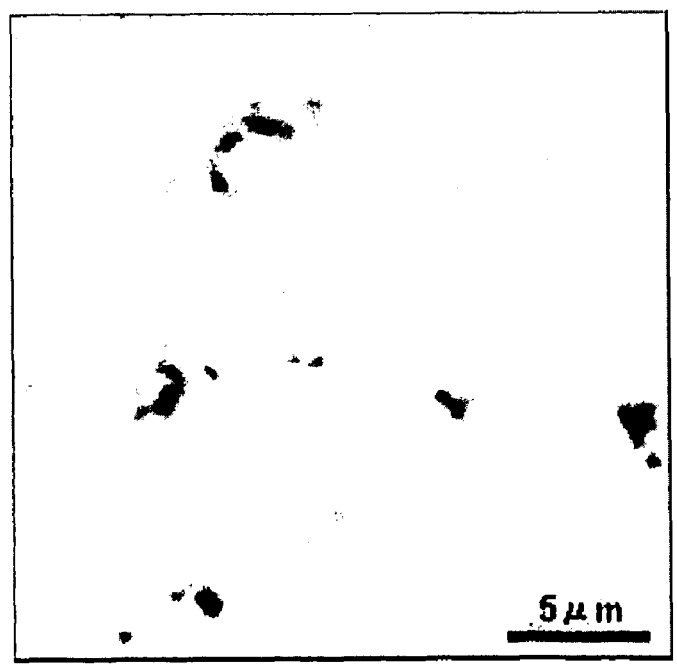
Figure 1C:
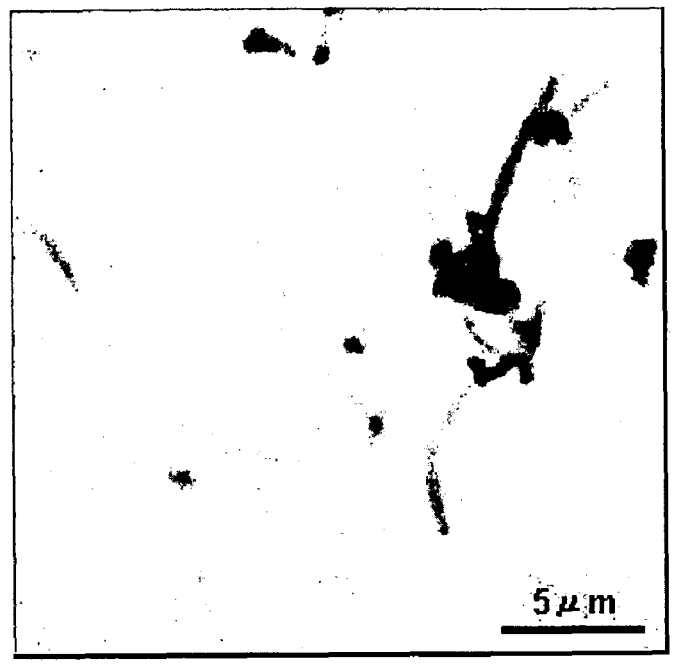
Figure 2A:
Figure 2B:
Figure 2C:
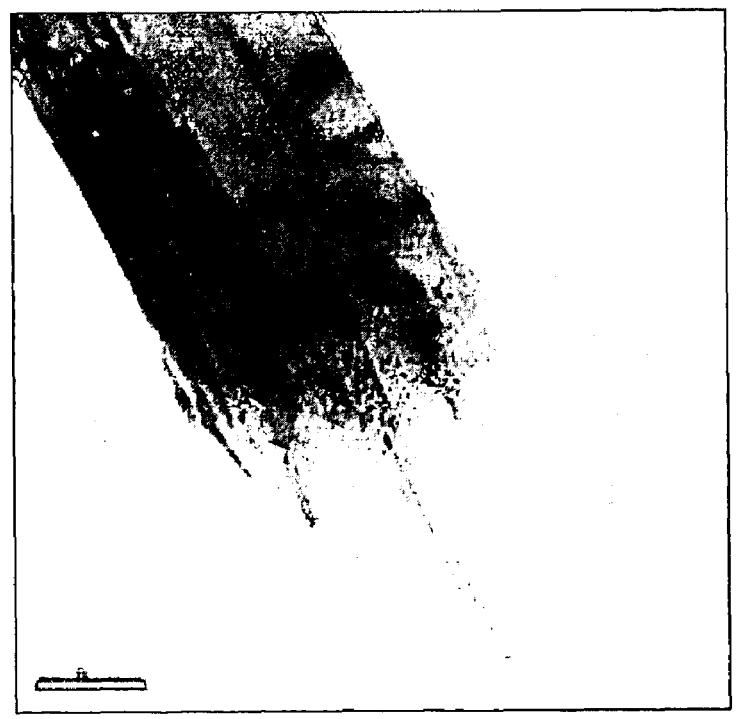

Carbon fibrous structure according to the present invention is, as shown in optical micrographs of FIG. 1A, FIG. 1B and FIG. 1C, or TEM photos of FIG. 2A, FIG. 2B, and FIG. 2C, composed of fine carbon fibers each having an outside diameter of 15-100 nm, and a granular part at which the fine carbon fibers are tied together so that the concerned carbon fibers are externally elongated from the granular part. As the shape of the extended end portions of the carbon fibers opposite to the end portions fixed with the granular part, in addition to the round closed shapes which are as-is shapes of the synthesized carbon fibers, some opened shapes which are formed by cutting the innate end portions of the synthesized carbon fibers off can be also observed, in TEM photos of FIG. 2B, and FIG. 2C.

The reason for restricting the outside diameter of the carbon fibers to a range of 15 nm to 100 nm is because when the outside diameter is less than 15 nm, the cross-sections of the carbon fibers do not have polygonal figures as described later. According to physical properties, the smaller the diameter of a fiber, the greater the number of carbon fibers will be for the same weight. This property would be followed by an enhanced electric conductivity. Thus, carbon fibrous structures having an outside diameter exceeding 100 nm are not preferred for use as modifiers or additives for a matrix such as a resin, etc. Particularly, it is more desirable for the outside diameter of the carbon fibers to be in the range of 20-70 nm. Carbon fibers that have a diameter within the preferable range and whose tubular graphene sheets are layered one by one in the direction that is orthogonal to the fiber axis, i.e., being of a multilayer type, can enjoy a high flexural rigidity and ample elasticity. In other words, such fibers would have a property of being easy to restore their original shape after undergoing any deformation. Therefore, these fibers tend to take a sparse structure in the matrix, even if the carbon fibrous structures have been compressed prior to being mixed into the matrix material.

Annealing at a temperature of not less than 1800° C. causes the carbon fibers to have polygonal cross-sections. Additionally, annealing lessens the spacing between the layered graphene sheets and increases the true density of the carbon fiber from 1.89 $g/cm^3$ to 2.1 $g/cm^3$. As a result, the carbon fibers become denser and have fewer defects in both the stacking direction and the surface direction of the graphene sheets that make up the carbon fiber, and their flexural rigidity (EI) and dispersibility in a resin can also be enhanced and improved.

Additionally, it is preferable that the outside diameter of a fine carbon fiber undergoes a change along the axial direction of the fiber. In the case that the outside diameter of the carbon fiber is not constant, but changes along the length of the fiber, it would be expected that some anchor effect may be provided to the carbon fiber at the interface with the matrix material, and thus migration of the carbon fibrous structure in the matrix can be restrained, leading to improved dispersion stability.

Furthermore, with respect to the shapes of the end portions of the fine carbon fibers, it is preferable that they include not only the round closed shapes but also include the unrounded cut shapes. When such opened cut shapes are existed, the friction coefficient of the end portions can be increased because the smoothness is deteriorated as compared with that on the round closed shapes, and further, owing to the interaction between the cut faces and matrix, the dispersion stability of the fibers is enhanced.

With respect to the mean length of the fine carbon fibers which constitutes the carbon fibrous structure, it is preferable to be not more than 20 µm. When the mean length is not more than 20 µm, it is possible to avoid causing inferior dispersion of the carbon fibrous structures into the matrix such as resin, wherein the inferior dispersion is due to the mutual entanglements of the fine carbon fibers. For instance, when the carbon fiber structures according to the present invention are used as an additive agent to a transparent matrix, the carbon fiber structures can provide desired physical properties even in a small adding amount, because they are likely to take sparse configuration and show a good dispersibility. Thus, the matrix is hardly influenced by coloring of black carbon fibers, and it is possible to produce products having good transparency such as a transparent conductive film. Incidentally, the mean length of the fine carbon fibers used herein is determined by taking a picture of the carbon fibrous structures with an electron microscope or the like, then tracing the individual fine carbon fiber which are extended outwardly from the granular part in the obtained image using an appropriate image analysis software, e.g., WinRoof™ (trade name, marketed by Mitani Corp.), thereby measuring the lengths of individual fine carbon fibers, and then calculating the mean value.

Thus, in a carbon fibrous structure according to the present invention, fine carbon fibers having a predetermined outside diameter and a predetermined length configures the three dimensional network and are bound together by a granular part produced in a growth process of the carbon fibers so that the carbon fibers are externally elongated from the granular part. Since multiple fine carbon fibers are not only entangled with each other, but fused together at the granular part, the carbon fibers will not disperse as single fibers, but will be dispersed as bulky carbon fibrous structures when added to a matrix such as a resin. Further since the fine carbon fibers have a mutual relay point that is the granular part and 2-20 pieces of fine carbon fibers, preferably, 3-10 pieces of fine carbon fibers are extended outwardly from the granular part, the carbon fiber structure can act very advantageously on the formation of electrically conductive paths as compared with the case of adding the corresponding fine carbon fibers are added in their separated form to the matrix.

Figure 2D:
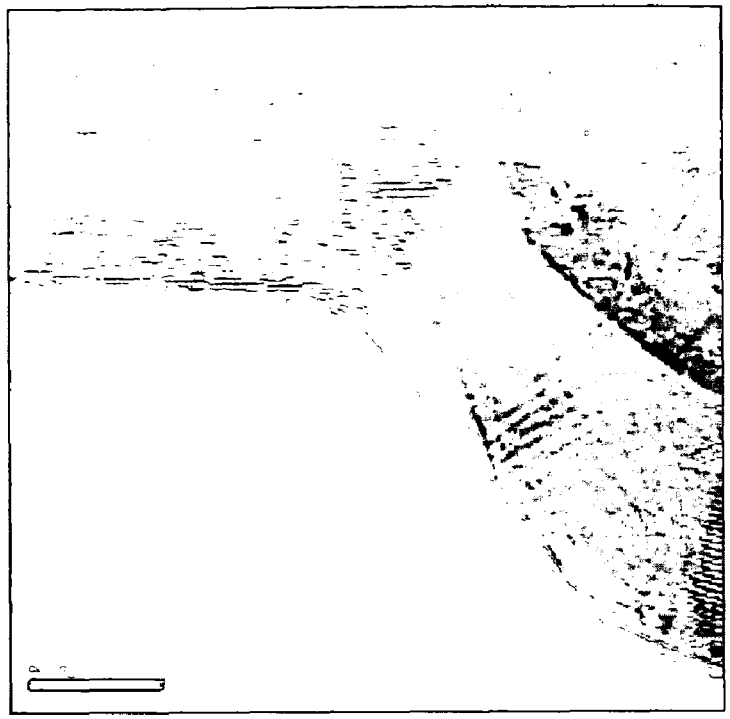

Since the granular part is produced in the growth process of the carbon fibers, the carbon-carbon bonds in the granular part are well developed. Further, the granular part appears to include mixed state of $sp^2$- and $sp^3$-bonds, although it is not clear accurately. After the synthesis process (in the "fibrous structure (intermediate)", the granular part and the fibrous parts are continuous mutually by virtue of a structure comprising patch-like sheets of carbon atoms laminated together. Further, after the high temperature treatment, at least a part of graphene layers constituting the granular part is continued on graphene layers constituting the fine carbon fibers elongated externally from the granular part, as shown in FIG. 2D. In the carbon fibrous structure according to the present invention, as symbolized by such a fact that the graphene layers constituting the granular part is continued on the graphene layers constituting the fine carbon fibers, the granular part and the fine carbon fibers are linked together (at least in a part) by carbon crystalline structural bonds. Thus, strong couplings between the granular part and each fine carbon fiber are produced.

With respect to the carbon fibers, the condition of being "extended outwardly" from the granular part used herein means principally that the carbon fibers and granular part are linked together by carbon crystalline structural bonds as mentioned above, but does not means that they are apparently combined together by any additional binding agent (involving carbonaceous ones).

As traces of the fact that the granular part is produced in the growth process of the carbon fibers as mentioned above, the granular part has at least one catalyst particle or void therein, the void being formed due to the volatilization and elimination of the catalyst particle during the heating process after the generation process. The void (or catalyst particle) is essentially independent from hollow parts which are formed in individual fine carbon fibers which are extended outwardly from the granular part (although, a few voids which happened to be associated with the hollow part may be observed).

Although the number of the catalyst particles or voids is not particularly limited, it may be about 1-100 a granular particle, more preferably, about 3-50 a granular particle. When the granular part is formed under the presence of catalyst particles the number of which is within the range mentioned above, the granular part formed can have a desirable size as mentioned later.

The per-unit size of the catalyst particle or void existing in the granular particle may be, for example, 1-100 nm, preferably, 2-40 nm, and more preferably, 3-15 nm.

Furthermore, it is preferable that the diameter of the granular part is larger than the outside diameter of the carbon fibers as shown in FIG. 2A and FIG. 2B. Concretely, for example, the diameter of granular part is 1.3-100 times larger than the outside diameter of the carbon fibers, preferably 1.3-50 times, and more preferably, 1.3-20 times larger, on average. When the granular part, which is the binding site of the carbon fibers, has a much larger particle diameter, that is, 1.3 times or more larger than the outer diameter of the carbon fibers, the carbon fibers that are externally elongated from the granular part have stronger binding force, and thus, even when the carbon fibrous structures are exposed to a relatively high shear stress during combining with a matrix such as resin, they can be dispersed as maintaining its three-dimensional carbon fibrous structures into the matrix. When the granular part has an extremely larger particle diameter, that is, exceeding 100 times of the outer diameter of the carbon fibers, the undesirable possibility that the fibrous characteristics of the carbon fibrous structure are lost will arise. Therefore, the carbon fibrous structure will be not suitable for an additive or compounding agent to various matrixes, and thus it is not desirable. Particularly, the carbon fibrous structure will not suitable for an additive of improving various physical properties while maintaining the transmittance of the matrix. The "particle diameter of the granular part" used herein is the value which is measured by assuming that the granular part, which is the binding site for the mutual carbon fibers, is one spherical particle.

Although the concrete value for the particle diameter of the granular part will be depended on the size of the carbon fibrous structure and the outer diameter of the fine carbon fiber in the carbon fibrous structure, for example, it may be 20-500 nm, more preferably, 20-400 nm, and most preferably, 20-300 nm, on average. When the granular part is taken such a size of the particle diameter, the granular part becomes one which is preferable to be a base for 2-20 pieces of the extended fine carbon fibers.

Furthermore, the granular part may be roughly globular in shape because the part is produced in the growth process of the carbon fibers as mentioned above. On average, the degree of roundness thereof may lay in the range of from 0.2 to <1, preferably, 0.5 to 0.99, and more preferably, 0.7 to 0.98.

Additionally, the binding of the carbon fibers at the granular part is very tight as compared with, for example, that in the structure in which mutual contacting points among the carbon fibers are fixed with carbonaceous material or carbonized substance therefrom. It is also because the granular part is produced in the growth process of the carbon fibers as mentioned above. Even under such a condition as to bring about selective cutting at defect portions of the carbon fibers of the carbon fibrous structure, the granular part (the binding site) is maintained stably. Specifically, for example, when the carbon fibrous structures are dispersed in a liquid medium and then subjected to ultrasonic treatment with a selected wavelength and a constant power under a load condition by which the mean length of the carbon fibers is reduced to be not more than 20 μm as shown in the Examples described later, the changing rate in the mean diameter of the granular parts is not observed, thus, the granular parts, i.e., the binding sites of fibers are maintained stably.

Furthermore, the carbon fibrous structure according to the present invention may exhibit a bulky, loose form in which the carbon fibers are sparsely dispersed, because the carbon fibrous structure is comprised of carbon fibers which are bound together by a central granular part so that the carbon fibers are externally elongated from the granular part as mentioned above. Concretely, it is desirable that the bulk density thereof is in the range of 0.0001-0.05 g/cm³. When the bulk density exceeds 0.05 g/cm³, the improvement of the physical properties in a matrix such as a resin would become difficult with a small dosage.

Furthermore, a carbon fibrous structure according to the present invention can enjoy good electric properties in itself, since the carbon fibers in the structure are bound together by a central granular part. For instance, it is desirable that a carbon fibrous structure according to the present invention has a powder electric resistance determined under a certain pressed density, 0.8 g/cm³, of not more than 0.06 Ω·cm, more preferably, 0.001 to 0.05 Ω·cm. If the particle's resistance exceeds 0.06 Ω·cm, it may become difficult to obtain a good electrically conductivity when the structure is added to a matrix such as a resin.

Figure 7:
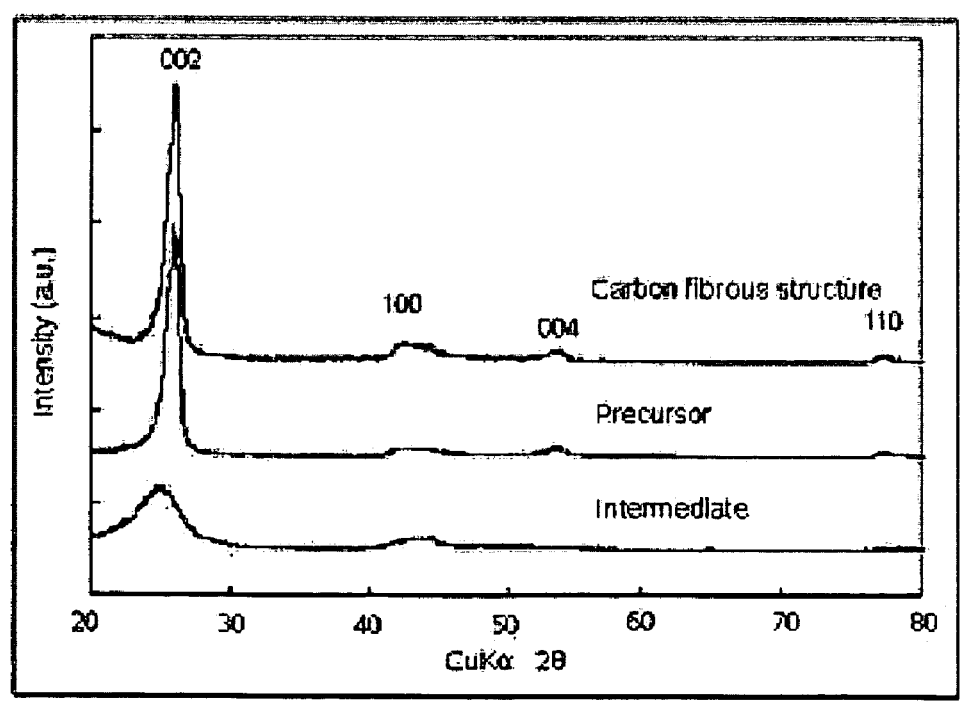

In order to enhance the strength and electric conductivity of a carbon fibrous structure according to the present invention, it is desirable that the graphene sheets that make up the carbon fibers have a small number of defects, and more specifically, for example, the $I_D/I_G$ ratio of the carbon fiber determined by Raman spectroscopy is not more than 0.2, and the $I_G/I_G$ ratio determined by the same is in the range of 0.6-1.2. Incidentally, in Raman spectroscopic analysis, with respect to a large single crystal graphite, only the peak (G band) at about 1580 cm⁻¹ appears. When the crystals are of finite ultrafine sizes or have any lattice defects, the peak (D band) at about 1360 cm⁻¹ can appear. Further when the range to be measured is widened, a G' band which is a bilateral asymmetry peak at about 2700 cm⁻¹ can be observed. With respect to the carbon fibrous structure according to the present invention, it is preferable that the G' band observed shows a bilateral symmetry shape as shown in FIG. 7. Although the derivation of the G' band is not clear, it is considered that the G' band will take a bilateral symmetry shape when the graphene sheet becomes a cylindrical shape. Further, when the intensity of the D band is weak and the intensity of the G' band is strong, it is considered that the graphene sheet has a small amount of defects. Therefore, when both the intensity ratio $(R=I_{1360}/I_{1580}=I_D/I_G)$ of the D band and the G band and the intensity ratio $(R=I_{2700}/I_{1580}=I_{G'}/I_G)$ of the G' band and the G band are laid within the individual ranges as mentioned above, it is possible to say that the number of defects in graphene sheets is low.

Furthermore, it is desirable that the carbon fibrous structure according to the present invention has a combustion initiation temperature in air of not less than 700° C. Such a high thermal stability would be brought about by the above mentioned facts that the graphene sheets has little defects and that the carbon fibers have a predetermined outside diameter.

A carbon fibrous structure according to the present invention having the above described, desirable configuration may be prepared as follows, although it is not limited thereto.

Basically, an organic compound such as a hydrocarbon is chemical thermally decomposed through the CVD process in the presence of ultrafine particles of a transition metal as a catalyst in order to obtain a fibrous structure (intermediate), and then the intermediate thus obtained undergoes a high temperature heating treatment in order to obtain carbon fiber precursor, and thereafter the precursor undergoes process of cutting selectively.

As a raw material organic compound, hydrocarbons such as benzene, toluene, xylene; carbon monoxide (CO); and alcohols such as ethanol may be used. It is preferable, but not limited, to use as carbon sources at least two carbon compounds which have different decomposition temperatures. Incidentally, the words "at least two carbon compounds" used herein not only include two or more kinds of raw materials, but also include one kind of raw material that can undergo a reaction, such as hydrodealkylation of toluene or xylene, during the course of synthesis of the fibrous structure such that in the subsequent thermal decomposition procedure it can function as at least two kinds of carbon compounds having different decomposition temperatures.

When as the carbon sources at least two kinds of carbon compounds are provided in the thermal decomposition reaction system, the decomposition temperatures of individual carbon compounds may be varied not only by the kinds of the carbon compounds, but also by the gas partial pressures of individual carbon compounds, or molar ratio between the compounds. Therefore, as the carbon compounds, a relatively large number of combinations can be used by adjusting the composition ratio of two or more carbon compounds in the raw gas.

For example, the fibrous structure (intermediate) can be prepared by using two or more carbon compounds in combination, while adjusting the gas partial pressures of the carbon compounds so that each compound performs mutually different decomposition temperature within a selected thermal decomposition reaction temperature range, and/or adjusting the residence time for the carbon compounds in the selected temperature region, wherein the carbon compounds to be selected are selected from the group consisting of alkanes or cycloalkanes such as methane, ethane, propanes, butanes, pentanes, hexanes, heptanes, cyclopropane, cycrohexane, particularly, alkanes having 1-7 carbon atoms; alkenes or cycloolefin such as ethylene, propylene, butylenes, pentenes, heptenes, cyclopentene, particularly, alkenes having 1-7 carbon atoms; alkynes such as acetylene, propyne, particularly, alkynes having 1-7 carbon atoms; aromatic or heteroaromatic hydrorocarbons such as benzene, toluene, styrene, xylene, naphthalene, methyl naphtalene, indene, phenanthrene, particularly, aromatic or heteroaromatic hydrorocarbons having 6-18 carbon atoms; alcohols such as methanol, ethanol, particularly, alcohols having 1-7 carbon atoms; and other carbon compounds involving such as carbon monoxide, ketones, ethers. Further, to optimize the mixing ratio can contribute to the efficiency of the preparation.

When a combination of methane and benzene is utilized among such combinations of two or more carbon compounds, it is desirable that the molar ratio of methane/benzene is >1-600, preferably, 1.1-200, and more preferably 3-100. The ratio is for the gas composition ratio at the inlet of the reaction furnace. For instance, when as one of carbon sources toluene is used, in consideration of the matter that 100% of the toluene decomposes into methane and benzene in proportions of 1:1 in the reaction furnace, only a deficiency of methane may be supplied separately. For example, in the case of adjusting the methane/benzene molar ratio to 3, 2 mol methane may be added to 1 mol toluene. As the methane to be added to the toluene, it is possible to use the methane which is contained as an unreacted form in the exhaust gas discharged from the reaction furnace, as well as a fresh methane specially supplied.

Using the composition ratio within such a range, it is possible to obtain the fibrous structure (intermediate) of three dimensional network structure in which both the carbon fiber parts and granular parts are efficiently developed.

Inert gases such as argon, helium, xenon; and hydrogen may be used as an atmosphere gas.

A mixture of transition metal such as iron, cobalt, molybdenum, or transition metal compounds such as ferrocene, metal acetate; and sulfur or a sulfur compound such as thiophene, ferric sulfide; may be used as a catalyst.

The fibrous structure (intermediate) may be synthesized using a CVD process with hydrocarbon or etc., which has been conventionally used in the art. The steps may comprise gasifying a mixture of hydrocarbon and a catalyst as a raw material, supplying the gasified mixture into a reaction furnace along with a carrier gas such as hydrogen gas, etc., and undergoing thermal decomposition at a temperature in the range of 800° C.-1300° C. By following such synthesis procedures, the product obtained is an aggregate, which is of several to several tens of centimeters in size and which is composed of plural fibrous structures (intermediates), each of which has a three dimensional configuration where fibers having 15-100 nm in outside diameter are bound together by a granular part that has grown around the catalyst particle as the nucleus.

The thermal decomposition reaction of the hydrocarbon raw material mainly occurs on the surface of the catalyst particles or on growing surface of granular parts that have grown around the catalyst particles as the nucleus, and the fibrous growth of carbon may be achieved when the recrystallization of the carbons generated by the decomposition progresses in a constant direction. When obtaining carbon fibrous structures according to the present invention, however, the balance between the thermal decomposition rate and the carbon fiber growth rate is intentionally varied. Namely, for instance, as mentioned above, to use as carbon sources at least two kinds of carbon compounds having different decomposition temperatures may allow the carbonaceous material to grow three dimensionally around the granular part as a centre, rather than in one dimensional direction. The three dimensional growth of the carbon fibers depends not only on the balance between the thermal decomposition rate and the growing rate, but also on the selectivity of the crystal face of the catalyst particle, residence time in the reaction furnace, temperature distribution in the furnace, etc. The balance between the decomposition rate and the growing rate is affected not only by the kinds of carbon sources mentioned above, but also by reaction temperatures, and gas temperatures, etc. Generally, when the growing rate is faster than the decomposition rate, the carbon material tends to grow into fibers, whereas when the thermal decomposition rate is faster than the growing rate, the carbon material tends to grow in peripheral directions of the catalyst particle. Accordingly, by changing the balance between the thermal decomposition rate and the growing rate intentionally, it is possible to control the growth of carbon material to occur in multi-direction rather than in single direction, and to produce the three dimensional structures.

In order to form the above mentioned three-dimensional configuration in the produced fibrous structure (intermediate), where the fibers are bound together by a granular part, with ease, it is desirable to optimize the compositions such as the catalyst used, the residence time in the reaction furnace, the reaction temperature and the gas temperature.

With respect to the method for preparing the fibrous structure (intermediate) with efficiency, as another approach to the aforementioned one that two or more carbon compounds which have mutually different decomposition temperature are used in an appropriate mixing ratio, there is an approach that the raw material gas supplied into the reaction furnace from a supply port is forced to form a turbulent flow in proximity to the supply port. The "turbulent flow" used herein means a furiously irregular flow, such as flow with vortexes.

In the reaction furnace, immediately after the raw material gas is supplied into the reaction furnace from the supply port, metal catalyst fine particles are produced by the decomposition of the transition metal compound as the catalyst involved in the raw material gas. The production of the fine particles is carried out through the following steps. Namely, at first, the transition metal compound is decomposed to make metal atoms, then, plural number of, for example, about one hundred of metal atoms come into collisions with each other to create a cluster. At the created cluster state, it can not function as a catalyst for the fibrous structure (intermediate). Then, the clusters are further aggregated by collisions with each other to grow into a metal crystalline particle of about 3-10 nm in size, and which particle comes into use as the metal catalyst fine particle for producing the fibrous structure (intermediate).

During the catalyst formation process as mentioned above, if the vortex flows belonging to the furiously turbulent flow are present, it is possible that the collisions of carbon atoms or collisions of clusters become more vigorously as compared with the collisions only due to the Brownian movement of atoms or collisions, and thus the collision frequency per unit time is enhanced so that the metal catalyst fine particles are produced within a shorter time and with higher efficiency. Further, since concentration, temperature, and etc. are homogenized by the force of vortex flow, the obtained metal catalyst fine particles become uniform in size.

Additionally, during the process of producing metal catalyst fine particles, a metal catalyst particles' aggregate in which numerous metal crystalline particles was aggregated by vigorous collisions with the force of vortex flows can be also formed. Since the metal catalyst particles are rapidly produced as mentioned above and thus the surface area of the metal catalyst as the site for the decomposition reaction of the carbon compound becomes large, the decomposition of carbon compound can be accelerated so that an ample amount of carbonaceous material can be provided. Whereby, the fine carbon fibers grow up in a radial pattern by taking individual metal catalyst particles in the aggregate as nuclei. When the thermal decomposition rate of a part of carbon compounds is faster than the growing rate of the carbon material as previously described, the carbon material may also grow in the circumferential direction so as to form the granular part around the aggregate, and thus the fibrous structure (intermediate) of the desired three dimensional configuration may be obtained with efficiency.

Incidentally, it may be also considered that there is a possibility that some of the metal catalyst fine particles in the aggregate are ones that have a lower activity than the other particles or ones that are deactivated on the reaction. If nonfibrous or very short fibrous carbon material layers grown by such catalyst fine particles before or after the catalyst fine particles aggregate are present at the circumferential area of the aggregate, the granular part of the intermediate may be formed.

The concrete means for creating the turbulence to the raw material gas flow near the supply port for the raw material gas, especially in the temperature range of 450-1000° C. which would be deduced as the range for creation and formation of the metal catalyst particles from the reaction kinetics, is not particularly limited. For example, it is adaptable to provide some type of collision member at a position where the raw material gas flow introduced from the supply port can be interfered by the collision section. The shape of the collision section is not particularly limited, as far as an adequate turbulent flow can be formed in the reaction furnace by the vortex flow which is created at the collision section as the starting point. For example, embodiments where various shapes of baffles, paddles, tapered tubes, umbrella shaped elements, and etc., are used singly or in varying combinations and located at one or more positions may be adaptable.

The fibrous structure (intermediate), obtained by heating the mixture of the catalyst and hydrocarbon at a constant temperature in the range of 800° C.-1300° C. after the creation and formation of the metal catalyst particle at a temperature of 450° C.-1000° C., has a structure that resembles sheets of carbon atoms laminated together, (and being still in half-raw, or incomplete condition). When analyzed with Raman spectroscopy, the D band of the intermediate is very large and many defects are observed. Further, the obtained fibrous structure (intermediate) is associated with unreacted raw materials, nonfibrous carbon, tar moiety, and catalyst metal.

Therefore, the fibrous structure (intermediate) is subjected to a high temperature heat treatment of 1800-2800° C. using a proper method in order to remove such residues from the intermediate and to produce the intended precursor which has few defects at the granular part and has an appropriate numbers of defects at the carbon fiber part.

For instance, the fibrous structure (intermediate) may be heated at 800-1300° C. to remove the unreacted raw material and volatile flux such as the tar moiety, and thereafter annealed at a high temperature of 1800-2800° C. to produce the intended precursor and, concurrently, to vaporize the catalyst metal, which is included in the fibers, to remove it from the fibers. In this process, it is possible to add a small amount of a reducing gas and carbon monoxide into the inert gas atmosphere to protect the carbon structures.

By annealing the fibrous structure (intermediate) at a temperature of 1800-2800° C., the patch-like sheets of carbon atoms are rearranged to associate mutually and then form multiple graphene sheet-like layers. When the annealing temperature is not more than 1800° C., the obtained precursor has a large numbers of defect portions, and thus there is a fear that the desired physical properties such as electrical conductivity are not attained. On the other hand, when the intermediate undergoes heat treatment at a temperature of more than 2800° C., the fine carbon fibers become particularly denser and come to have an extremely small number of defect parts, and the strength of the fine carbon fiber parts becomes relatively higher as compared with that of the granular part. Therefore, there is a fear that the selective cutting at the defect portions of the fine carbon fiber parts mentioned later becomes difficult. As mentioned above, with respect to the precursor which is prepared by annealing of the fibrous structure (intermediate), although it is preferable that the number of the defects in the graphene sheets which constitute the fine carbon fibers is low, but the defects should exist to a certain proper extent in order to cut the fibers. Thus, it is preferable to prepare the precursor by annealing the fibrous structure (intermediate) at a temperature in the range of 1800-2800° C.

Further, it is preferable that the precursor has an area-based circle-equivalent mean diameter of 50-100 μm, and more preferably, 60-90 μm. The "area-based circle-equivalent mean diameter" used herein is the value which is determined by taking a picture of the outside shapes of the precursors with a suitable electron microscope, etc., tracing the contours of the respective precursors in the obtained picture using a suitable image analysis software, e.g., WinRoof™ (Mitani Corp.), and measuring the area within each individual contour, calculating the circle-equivalent mean diameter of each individual precursors, and then, averaging the calculated data.

Incidentally, in order to obtain the desirable carbon fibrous structure, it is preferable to perform a crushing treatment before or after such a high temperature heat treatment, in order to obtain the precursors each having an area-based circle-equivalent mean diameter of several micrometers to several tens micrometers, from the viewpoint of handling.

with respect to the precursor which is prepared by annealing of the fibrous structure (intermediate), although it is preferable that the number of the defects in the graphene sheets which constitute the fine carbon fibers at the stage of the precursor is low from the viewpoint of giving a high strength and a high electrical conductivity to the carbon fibrous structure of the present invention as the final product, but the defects should exist to a certain proper extent in order to cut the fibers. Concretely, for instance, it is preferable that the $I_D/I_G$ ratio of the precursor determined by Raman spectroscopy is not more than 0.2, and the $I_{G'}/I_G$ ratio determined by the same is in the range of 0.6-1.2. Further, it is preferable that the G' band of the precursor shows a almost bilateral symmetry shape. Although the derivation of the G' band is not clear, it is considered that the G' band will take a bilateral symmetry shape when the graphene sheet becomes a cylindrical shape. Further, when the intensity of the D band is weak and the intensity of the G' band is strong, it is considered that the graphene sheet has a small amount of defects. Therefore, when both the intensity ratio $(R=I_{1360}/I_{1580}=I_D/I_G)$ of the D band and the G band and the intensity ratio $(R=I_{2700}/I_{1580}=I_{G'}/I_G)$ of the G' band and the C band are laid within the individual ranges as mentioned above, it is possible to say that the number of defects in graphene sheets is low, but the defects exist to a certain extent suitable for performing the selective cutting the carbon fiber parts at the defect portions.

Incidentally, the "defect" described herein denotes the incomplete portion of atomic arrangement of the graphene sheet (lattice defect) which is caused by the entry of unnecessary atom as an impurity, the lack of necessary carbon atom, or the misalignment of the carbon atom, etc.

Figure 6:
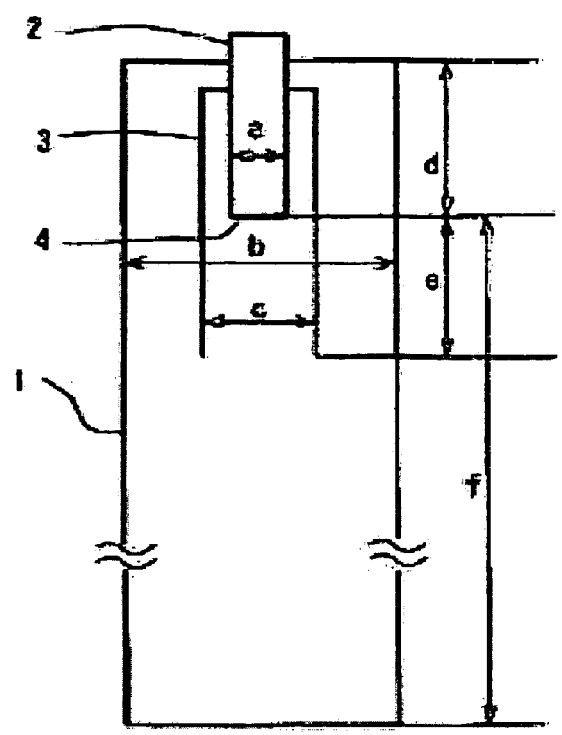

In the arrangement of the graphene sheet, the point defect (invasion type, substitution type, defect due to hole (Frenkel defect and Schottky defect)), the line defect (defect due to dislocation (edge dislocation and screw dislocation), or the plane defect (stacking fault) can appear. When these defects exist in the precursor, it is possible to cut the fiber selectively at the defect portion since the binding force between the carbon atoms at such a defect portion is weak as compared with that at a portion where the carbon atoms are regularly arranged in the graphene sheet. As an example of such a defect portion, a TEM photo of a defect portion which possesses a distorted and bent shape and which exists in the fine carbon fiber is shown in FIG. 6.

In general, fine carbon fibers have a very large aspect ratio, and they form a lump where they are densely entangled mutually. Thus, the dispersibility of the fine carbon fibers in the matrix becomes very worse. Therefore, if it is intended to provide desired physical properties to the matrix, the addition of large volume of the fine carbon fibers is required. Thus, it is difficult to attain the improvement of the physical properties while maintaining the good transmittance of the matrix.

We, the inventors, have found that a novel carbon fibrous structure which excels in the dispersibility into the matrix, and which has a granular parts and takes a three dimensional structure of fine carbon fiber can be obtained by constructing a precursor of a three dimensional structure which is provided with plural number of fine carbon fibers each having defects to a certain extent and a granular part by which the fine carbon fibers are bound together by means of controlling the various conditions for the growth of the fine carbon fibers, and cutting the fine carbon fibers in the precursor selectively at the defect portions.

As the method for cutting the fine carbon fibers in the precursor selectively at the defect portions, it is preferable that the method does not cause any deterioration in the carbon fiber parts of having no defect originally, that is, the method does not create any fresh defect on the carbon fiber parts, although it is not particularly limited thereto. For instance, it is possible to cut selectively as follows.

A method where the precursors for the carbon fibrous structures are dispersed in a liquid medium, and then the obtained dispersion a ultrasonic waves are irradiated with ultrasonic waves of a prescribed frequency at a constant power can be utilized. When irradiating with the ultrasonic waves, standing waves corresponding to the applied frequency are generated in the liquid medium, and physical forces are produced every integral multiples of wavelength γ/2, and thus it is possible to attain the selective cutting of the carbon fibers at the defect portions where the bonding force between the carbon atoms is weak.

For instance, in the case of utilizing the ultrasonic waves, as the physical forces capable of performing such a selective cutting of the carbon fiber can be divided roughly into two kinds. One of them is the effect owing to the cavitation of low frequency ultrasonic waves, and the other is the acceleration of the liquid molecules in the liquid medium by high frequency ultrasonic waves so as to allow the molecules to cut the carbon fibers selectively.

Cavitation shows correlation with the dissolved gas(es) in the liquid medium and the vapor pressure of the liquid medium. In general, when an infinite number of the gas molecules existing in the liquid medium are irradiated with the ultrasonic waves having a frequency of 20-100 kHz, positive and negative pressures are applied alternately to the gas molecules. Thus, the gas molecules are compressed by the positive pressure, and the next moment the compressed gas molecules expand extremely with the negative pressure. By repeating the compression and the expansion alternately, the gas molecules come to gain a very high pressure on the compression, and at the compression limit the bubbles of gas molecules burst and disappear. The shock waves created when the bubbles burst act onto the defects in the fiber parts of the carbon fibrous structure (intermediate), thereby the cavitation effect of cutting the fiber is obtained.

As mentioned above, the carbon fibrous structure according to the present invention can be obtained by cutting selectivity the precursor which is composed of fine carbon fibers which are allocated as three dimensional network structure, and a granular part at which the fine carbon fibers are tied together so that the concerned carbon fibers are externally elongated from the granular part.

When two or more granular parts are present in a precursor, wherein each granular part binds the fibers so as to form the three dimensional network, the mean distance between adjacent granular parts may be, for example, 0.5-100 µm, preferably, 0.5-70 µm, and more preferably, 0.5-50 µm. The distance between adjacent granular parts used herein is determined by measuring distance from the center of a granular part to the center of another granular part which is adjacent the former granular part. When the mean distance between the granular parts is less than 0.5 µm, the carbon fibrous structure which is obtained by subjecting the precursor to the process of cutting selectively thereafter is compelled to have a configuration where the carbon fibers are of having a short length and they form an inadequately developed three dimensional network. Therefore, it may become difficult to form good electrically conductive paths when the carbon fiber structures each having such an inadequately developed three dimensional network are added and dispersed to the matrix. Meanwhile, when the mean distance exceeds 100 µm, many single carbon fibers which are separated from each other are produced as a side product on the process of cutting selectively, in addition to the intended carbon fiber structures, and which is followed by a degression in the yield of the carbon fibrous structures. Further, since the obtained carbon fibrous structure comes to own relatively long carbon fiber, and thus, an undesirable increase in viscosity may be expected to happen upon adding and dispersing the carbon fibrous structures in the matrix. The increase in viscosity may result in an inferior dispersibility of the carbon fibrous structures to the matrix.

Therefore, the mean length of the carbon fibers which are extended from the granular part in the carbon fiber structure according to the present invention is preferable to be not more than 20 μm. Because the dispersibility is improved, the adding amount to be needed can be reduced, and thus the carbon fibrous structure according to the present invention can be utilized for the purpose of showing good transparency such as transparent electrically conductive film.

Furthermore, in order to give a high strength and a good electrical conductivity, it is preferable that the $I_D/I_G$ ratio of the carbon fibrous structure of the present invention is not more than 0.2, and the $I_{G'}/I_G$ ratio is in the range of 0.6-1.2, wherein the ratios are determined by Raman spectroscopy.

Incidentally, when the carbon fibrous structures are added as additive to a matrix, the carbon fibrous structures may be used solely as the additive. Alternatively, it is also possible to use the single fine carbon fibers having no granular part and/or the precursors each having the three dimensional network structure as other additives, along with the carbon fibrous structure as a main ingredient, in any combination and any mixing ratio. When using the single fine carbon fibers having no granular part in combination with the carbon fibrous structure, a certain cross linking effect between them would be expected, and it is considered that the effect may bring an advantage in the formation of the conductive paths as compared with the case of using the single fine carbon fibers solely.

The reason why the granular part (binding site) is sustained stably is probably due to the fact that the metal catalyst minute particles (including deactivated catalyst particles) exist in the granular part intensively rather than the fine carbon fiber parts at the state of the fibrous structure (intermediate). Incidentally, on the observation using TEM, it is possible to confirm that most of the metal catalyst minute particles exist in the granular part of the fibrous structure (intermediate). These metal catalyst minute particles would function as catalyst for regularly aligning the graphite layer.

EXAMPLES

Hereinafter, this invention will be illustrated in detail by practical examples. However, the invention is not limited to the following examples.

The respective physical properties illustrated later are measured by the following protocols.

<Area Based Circle-Equivalent Mean Diameter of Precursor>

First, a photograph of three dimensional network structures (precursors) which are substance in the previous stage of the carbon fibrous structures according to the present invention was taken with SEM (200 magnifications). On the taken SEM photo, contours of the individual carbon fibrous structures were traced using the image analysis software, Win-Roof™ (trade name, marketed by Mitani Corp.), and area within each individual contour was measured, circle-equivalent mean diameter of each individual carbon fibrous structure was calculated, and then, the calculated data were averaged to define the area based circle-equivalent mean diameter of the precursors. On this determination, only precursors with clear contours were taken as objects to be measured, and broken ones with unclear contours were omitted. Using all precursors that can be taken as objects in one single field of view (approximately, 60-80 pieces), about 200 pieces in total were measured with three fields of views.

<Mean Length of Fine Carbon Fibers in Precursor>

Photograph of precursors was taken with SEM (1000-3000 magnifications). On the taken SEM photo, all places where the granular parts are mutually linked with a fine carbon fiber are found out. Then, at the respective places, the distance between the adjacent granular parts which are mutually linked with the fine carbon fiber (the length of the fine carbon fiber including the center of a granular part at one end to the center of another granular part at another end) is measured using the image analysis software, WinRoof™ (trade name, marketed by Mitani Corp.), and then the data obtained are averaged in order to find out the mean length. On this determination, only precursors with clear contours were taken as objects to be measured, and broken ones with unclear contours were omitted. Using all precursors that can be taken as objects in one single field of view (approximately, 60-80 pieces), about 200 pieces in total were measured with three fields of views.

<Mean Length of Fine Carbon Fibers in Carbon Fibrous Structure>

Photograph of carbon fibrous structures according to the present invention was taken with SEM (1000-5000 magnifications). On the taken SEM photo, the length of respective fine carbon fiber from the center of the granular part to the opposite end portion of the extended fine carbon fiber are measured using the image analysis software, WinRoof™ (trade name, marketed by Mitani Corp.), and then the data obtained are averaged in order to find out the mean length. On this determination, only carbon fibrous structures with clear contours were taken as objects to be measured, and broken ones with unclear contours were omitted. Using all carbon fibrous structures that can be taken as objects in one single field of view (approximately, 60-80 pieces), about 200 pieces in total were measured with three fields of views.

<Mean Diameter and Roundness of the Granular Part, and Ratio of the Granular Part to the Fine Carbon Fiber>

First, a photograph of the precursors or carbon fibrous structures was taken with SEM.

On the SEM photo, assuming each individual granular part which is the binding point of carbon fibers to be a particle, contours of the individual granular parts were traced using the image analysis software, WinRoof™ (trade name, marketed by Mitani Corp.), and area within each individual contour was measured, circle-equivalent mean diameter of each individual granular part was calculated, and then, the calculated data were averaged to determine the mean diameter of the granular parts of the precursors or the carbon fibrous structures.

Roundness (R) is determined by inputting value of the area (A) within each individual contour computed by the above and a measured value of each individual contour's length (L) to the following equation to calculate the roundness of each individual granular part, and then, averaging the calculated data.

$$R = A * 4\pi/L^2 \qquad \text{[Numerical Formula 1]}$$

Further, the outer diameter of the fine carbon fibers in the individual precursors or carbon fibrous structures to be measured are determined, and then, from the outer diameter determined and the circle-equivalent mean diameter of the granular part calculated as above, the ratio of circle-equivalent mean diameter to the outer diameter of the fine carbon fiber is calculated for each individual precursor or the carbon fibrous structure, and then the data obtained are averaged.

Incidentally, on the taken SEM photo, only precursors or carbon fibrous structures with clear contours were taken as objects to be measured, and broken ones with unclear contours were omitted. Using all precursors or carbon fibrous structures that can be taken as objects in one single field of view (approximately, 60-80 pieces), about 200 pieces of precursors or carbon fibrous structures in total were measured with three fields of views.

<Measurement of Bulk Density>

1 g of powder was placed into a 70 mm caliber transparent cylinder equipped with a distribution plate, then air supply at 0.1 Mpa of pressure, and 1.3 liter in capacity was applied from the lower side of the distribution plate in order to blow off the powder and thereafter allowed the powder to settle naturally. After the fifth air blowing, the height of the settled powder layer was measured. Any 6 points were adopted as the measuring points, and the average of the 6 points was calculated in order to determine the bulk density.

<Raman Spectroscopic Analysis>

The Raman spectroscopic analysis was performed with LabRam 800 manufactured by HORIBA JOBIN YVON, S.A.S., using 514 nm argon laser.

<TG Combustion Temperature>

Combustion behavior was determined using TG-DTA manufactured by MAC SCIENCE CO. LTD., at air flow rate of 0.1 liter/minute and heating rate of 10° C./minute with respect to a sample of the intermediate or the carbon fibrous structure which was weighed to be 10 mg and placed in an alumina crucible.

When burning, TG indicates a quantity reduction and DTA indicates an exothermic peak. Thus, the top position of the exothermic peak was defined as the combustion initiation temperature.

<X Ray Diffraction>

Using the powder X ray diffraction equipment (JDX3532, manufactured by JEOL Ltd.), precursors after annealing processing and carbon fibrous structures were determined. Kα ray which was generated with Cu tube at 40 kV, 30 mV was used, and the measurement of the spacing was performed in accordance with the method defined by The Japan Society for the Promotion of Science (JSPS), described in "Latest Experimental Technique For Carbon Materials (Analysis Part)", Edited by Carbon Society of Japan), and as the internal standard silicon powder was used.

<Particle's Resistance and Decompressibility>

1 g of powder sample was scaled, and then press-loaded into a resinous die (inner dimensions: L 40 mm, W 10 mm, H 80 mm), and the displacement and load were read out. A constant current was applied to the powder by the four-terminal method, and in this condition the voltage was measured. After measuring the voltage until the density came to 0.9 g/cm³, the applied pressure was released and the density after decompression was measured. Measurements taken when the powder was compressed to 0.5, 0.8 or 0.9 g/cm³ were adopted as the particle's resistance.

<Total Light Transmittance>

Total light transmittance was determined in accordance with JIS K 7361, by using a haze/transmittance meter (HM-150, manufactured by MURAKAMI COLOR RESEARCH LABORATORY), for a coating film having a prescribed thickness formed on a glass plate (total light transmittance of 91.0%, 50×50×2 mm).

<Surface Resistivity>

50×50 mm of coated harden film was prepared on a glass plate. Using 4-pin probe type resistivity meters (MCP-T600, MCP-HT4500, both manufactured by Mitsubishi Chemical), the resistance (Ω) at nine points of the coated film surface was measured, then the measured values are converted into those of volume resistivity (Ω·cm) by the resistivity meters, and then average was calculated.

Synthetic Example 1

By the CVD process, carbon fibrous structures were synthesized using toluene as the raw material.

The synthesis was carried out in the presence of a mixture of ferrocene and thiophene as the catalyst, and under the reducing atmosphere of hydrogen gas. Toluene and the catalyst were heated to 380° C. along with the hydrogen gas, and then they were supplied to the generation furnace, and underwent thermal decomposition at 1250° C. in order to obtain the fibrous structures (intermediate).

The generation furnace used for the fibrous structures (intermediate) is illustrated schematically in FIG. 6. As shown in FIG. 6, the generation furnace 1 was equipped at the upper part thereof with a inlet nozzle 2 for introducing the raw material mixture gas comprising toluene, catalyst and hydrogen gas as aforementioned into the generation furnace 1. Further, at the outside of the inlet nozzle 2, a cylindrical-shaped collision member 3 was provided. The collision member 3 was set to be able to interfere in the raw material gas flow introduced from the raw material supply port 4 located at the lower end of the inlet nozzle 2. In the generation furnace 1 used in this Example, given that the inner diameter of the inlet nozzle 2, the inner diameter of the generation furnace 1, the inner diameter of the cylindrical-shaped collision member 3, the distance from the upper end of the generation furnace 1 to the raw material mixture gas supply port 4, the distance from the raw material mixture gas supply port 4 to the lower end of the collision member 3, and the distance from the raw material mixture gas supply port 4 to the lower end of the generation furnace 1 were "a", "b", "c", "d", "e", and "f", respectively, the ratio among the above dimensions was set as a:b:c:d:e:f=1.0:3.6:1.8:3.2:2.0:21.0. The raw material gas supplying rate to the generation furnace was 1850 NL/min., and the pressure was 1.03 atms.

The synthesized fibrous structure (intermediate) was baked at 900° C. in nitrogen gas in order to remove hydrocarbons such as tar, which had been included as impurities, and thus to purify. The R value measured by the Raman spectroscopic analysis of the fibrous structure (intermediate) after receiving the removing and purification was found to be 0.98.

Figure 3:
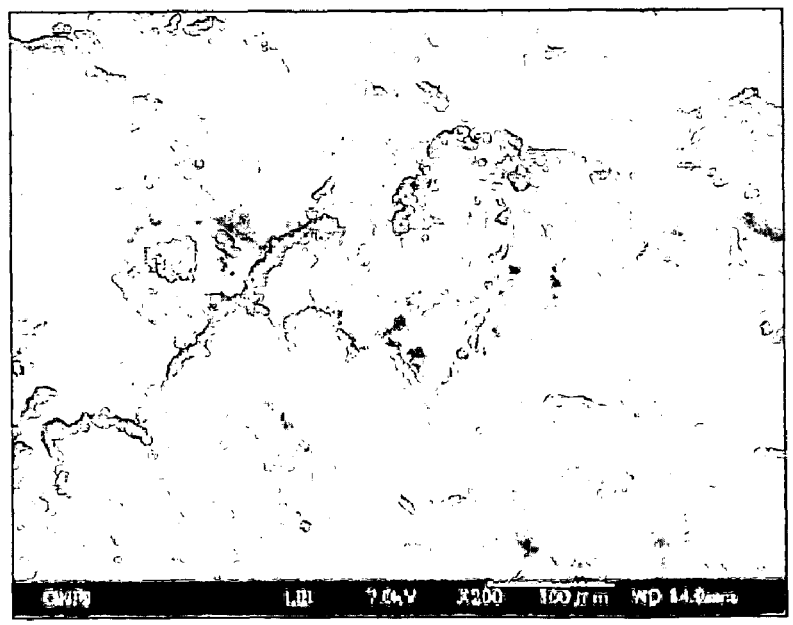
Figure 4:
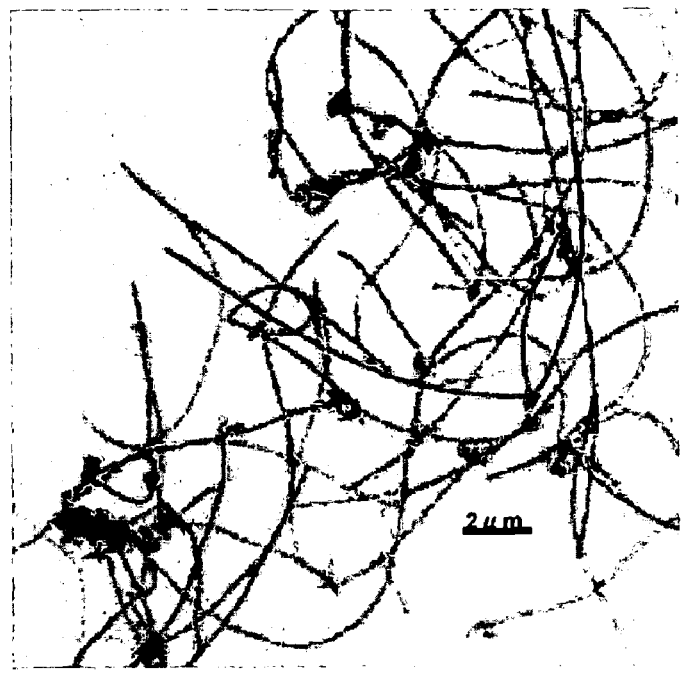

Further, the fibrous structure (intermediate) underwent a high temperature heat treatment at 2600° C. The obtained aggregates of the precursors underwent pulverization using an air flow pulverizer in order to produce the precursors which each had three dimensional network structure and which were substance in the previous stage of the carbon fibrous structure according to the present invention. FIG. 3 shows SEM photo of the obtained precursors as mounted on a sample holder for electron microscope. A sample for electron microscopes was prepared by dispersing the obtained precursors into toluene. FIG. 4 show SEM photo of the sample.

The result from the examination for distance between the granular parts of the obtained precursors is shown in Table 1. The result from the examination for distribution of the particle size of the granular parts of the obtained precursors is shown in Table 2.

TABLE 1

| Distribution of the length of fine carbon fibers (pieces) | Synthetic Example 1 | Synthetic Example 2 |
|---|---|---|
| <1 μm | 2 | 4 |
| 1 μm to <5 μm | 58 | 106 |
| 5 μm to <10 μm | 57 | 66 |
| 10 μm to <15 μm | 45 | 14 |
| 15 μm to <20 μm | 21 | 7 |
| 20 μm to <25 μm | 9 | 2 |
| 25 μm to <30 μm | 5 | 0 |
| 35 μm to <40 μm | 3 | 1 |
| ≧40 μm | 0 | 0 |
| Mean length of fine carbon fibers | 10.21 μm | 10.03 μm |

Figure 5:
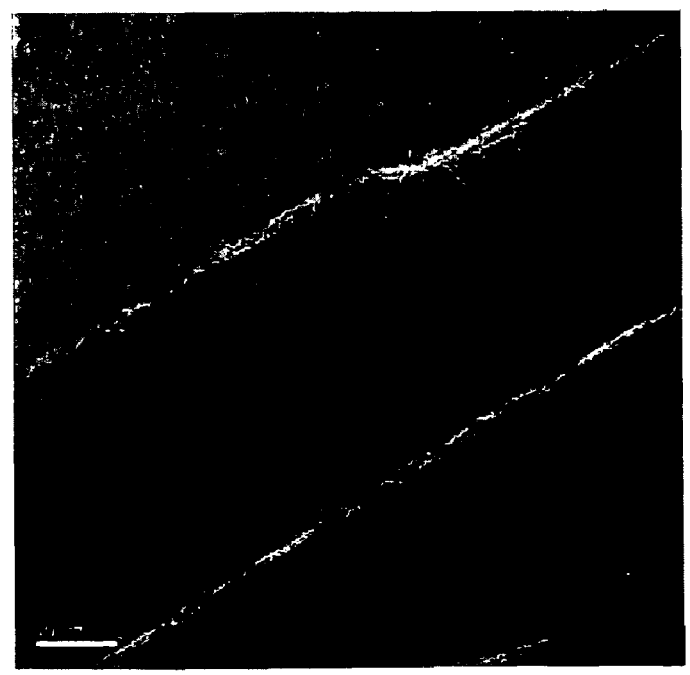

Further, X-ray diffraction analysis and Raman spectroscopic analysis were performed on the precursors after the high temperature heat treatment. The various physical properties of the precursors obtained in Synthetic Example are shown in FIG. 5.

It was found that the fibrous structures had an area based circle-equivalent mean diameter of 70.3 μm. It was also found that the granular parts in the precursors had the mean particle size of 0.289 μm, that was 4.8 times larger than the mean outer diameter of the carbon fibers in the precursors. The mean roundness of the granular parts was found to be 0.81, and the mean distance between the granular parts was found to be 10.21 μm.

Additionally, it was found that precursors had the bulk density of 0.0042 g/cm$^3$, Raman $I_D/I_G$ ratio of 0.083, Raman $I_{G'}/I_G$ ratio of 0.642, TG combustion temperature of 768° C., spacing of 3.383 angstroms, particle's resistance of 0.0082 Ω·cm, and density after decompression of 0.20 g/cm$^3$.

Synthetic Example 2

By the CVD process, precursors for the carbon fibrous structures were synthesized using a part of the exhaust gas from the generation furnace as a recycling gas in order to use as the carbon source the carbon compounds such as methane, etc., included in the recycling gas, as well as a fresh toluene.

The synthesis was carried out in the presence of a mixture of ferrocene and thiophene as the catalyst, and under the reducing atmosphere of hydrogen gas. Toluene and the catalyst as a fresh raw material were heated to 380° C. along with the hydrogen gas in a preheat furnace, while a part of the exhaust gas taken out from the lower end of the generation furnace was used as a recycling gas. After it was adjusted to 380° C., it was mixed with the fresh raw material gas on the way of the supplying line for the fresh raw material to the generation furnace. The mixed gas was then supplied to the generation furnace.

The composition ratio in the recycling gas used were found to be $CH_4$ 7.5%, $C_6H_6$ 0.3%, $C_2H_2$ 0.7%, $C_2H_6$ 0.1%, CO 0.3%, $N_2$ 3.5%, and $H_2$ 87.6% by the volume based molar ratio. The mixing flow rate was adjusted so that the mixing molar ratio of methane and benzene in the raw material gas to be supplied to the generation furnace, $CH_4/C_6H_6$ was set to 3.44 (wherein, it was considered that the toluene in the fresh raw material gas had been decomposed at 100% to $CH_4$:$C_6H_6$ 1:1 by the heating in the preheat furnace).

In the final raw material gas, $C_2H_2$, $C_2H_6$, and CO which were involved in the recycling gas to be mixed were naturally included. However, since these ingredients were very small amount, they may substantially be ignored as the carbon source.

Then they were underwent thermal decomposition at 1250° C. in order to obtain the fibrous structures (intermediate) in an analogous fashion as Synthetic Example 1.

The constitution of the generation furnace used for the fibrous structures (intermediate) was the same as that shown in FIG. 6, except that the cylindrical-shaped collision member 3 was omitted. The raw material gas supplying rate to the generation furnace was 1850 NL/min., and the pressure was 1.03 atms as in the case of Synthetic Example 1.

The synthesized fibrous structure (intermediate) was baked at 900° C. in nitrogen gas in order to remove hydrocarbons such as tar. The R value measured by the Raman spectroscopic analysis of the fibrous structure (intermediate) after baking was found to be 0.83.

Further, the fibrous structure (intermediate) thus treated underwent a high temperature heat treatment at 2600° C. The obtained aggregates of the precursors underwent pulverization using an air flow pulverizer in order to produce the precursors.

SEM photo of the obtained precursors as mounted on a sample holder for electron microscope was in much the same with that of Synthetic Example 1 shown in FIG. 3. SEM photo of the sample for electron microscopes prepared by dispersing the obtained precursors into toluene was also in much the same with that of Synthetic Example 1 shown in FIG. 4.

The result from the examination for distance between the granular parts of the obtained precursors is shown in Table 1. The result from the examination for distribution of the particle size of the granular parts of the obtained precursors is shown in Table 2.

TABLE 2

| Distribution of the particle size of granular parts (pieces) | Synthetic Example 1 (Precursor) | Synthetic Example 2 (Precursor) |
|---|---|---|
| <0.1 μm | 0 | 0 |
| 0.1 μm to <0.2 μm | 21 | 10 |
| 0.2 μm to <0.3 μm | 86 | 78 |
| 0.3 μm to <0.4 μm | 52 | 62 |
| 0.4 μm to <0.5 μm | 20 | 24 |
| 0.5 μm to <0.6 μm | 11 | 14 |
| 0.6 μm to <0.7 μm | 5 | 5 |
| ≧0.8 μm | 5 | 7 |
| Mean particle size of granular parts | 0.289 μm | 0.309 μm |

Further, X-ray diffraction analysis and Raman spectroscopic analysis were performed on the precursors after the high temperature heat treatment. The various physical properties of the precursors obtained in Synthetic Example 2 are shown in FIG. 5.

It was found that the fibrous structures had an area based circle-equivalent mean diameter of 67.3 μm. It was also found that the granular parts in the precursors had the mean particle size of 0.309 μm, that was 5.2 times larger than the mean outer diameter of the carbon fibers in the precursors. The mean roundness of the granular parts was found to be 0.78, and the mean distance between the granular parts was found to be 10.03 μm.

Additionally, it was found that precursors had the bulk density of 0.0055 g/cm$^3$, Raman $I_D/I_G$ ratio of 0.074, Raman $I_{G'}/I_G$ ratio of 0.528, TC combustion temperature of 802° C., spacing of 3.386 angstroms, particle's resistance of 0.0095 Ω·cm, and density after decompression of 0.19 g/cm³.

Example 1

To 100 ml of toluene in a lidded vial, the precursors prepared in Synthetic Example 1 were added at a rate of 30 μg/ml in order to prepare the dispersion liquid sample of the precursors.

To the dispersion liquid sample of the precursors thus prepared, ultrasonic waves were applied using a ultrasonic cleaner (manufactured by SND Co., Ltd., Trade Name: USK-3) of which generated frequency was 38 kHz and power was 150 w, in order to perform the process of cutting selectively against the precursors.

The fine carbon fibrous structures prepared by the above treatment were observed using an optical microscope and a TEM. From the result of the observation, it was found that the obtained carbon fibrous structure possessed a form in which plural number of fine carbon fibers were extended outwardly from a granular part which located at the central potion of the structure. Further, from the observation using TEM, it was also found that most of defects in the carbon fibrous structure resided at the fine carbon fiber parts as compared with the number of defects resided at the granular part. Optical micrographs and TEM photos of the carbon fibrous structures obtained by the irradiation with the ultrasonic waves for 500 minutes are shown in FIG. 1A, FIG. 1B, FIG. 1C, FIG. 2A, FIG. 2B, FIG. 2C and FIG. 2D. It was found that the interior of the fine carbon fiber was hollow (about 5 nm). Further, with respect to the shape of the outward end portion of the fine carbon fiber opposite to the granular part, the opened shapes and the closed shapes in mixed state were observed.

The distribution of the length of the fine carbon fibers extended outwardly from the granular part was investigated by taking a SEM photo of the carbon fibrous structures obtained by the irradiation with the ultrasonic waves, and then using the image analysis software, WinRoof™ (trade name, marketed by Mitani Corp.). The result was shown in the Table 3. Further, the result from the examination for the distribution of the particle size of the granular parts is shown in Table 4.

The mean length of the fine carbon fibers in the precursor of Synthetic Example 1 before the process of cutting selectively was found to be 10.21 μm, while the mean length of the fine carbon fibers in the carbon fibrous structure after the ultrasonic wave irradiation was stated was found to be 4.95 μm, which value was about half the value of the precursor. This result showed that many breakages were given in the fine carbon fibers of the precursors by the process of cutting selectively using the ultrasonic wave irradiation.

However, when comparing the mean particle size of the granular parts of the carbon fibrous structures after 500 minutes' ultrasonic waves irradiation to that of the granular parts of precursors, the sizes were found to be about 0.3 μm in both cases, and thus, no variability was observed in the mean particle size of the granular parts before and after the ultrasonic wave irradiation. Considering measurement error, etc., it was found that the granular parts themselves were hardly destroyed even under the load condition that many breakages were given in the fine carbon, and the granular parts still function as the binding site for the fibers mutually.

Further, it was found that the granular parts in the carbon fibrous structures had the mean particle size of 0.304 μm, that was 5.1 times larger than the mean outer diameter of the carbon fibers in the carbon fibrous structure. The mean roundness of the granular parts was found to be 0.84. Therefore, no substantial change in the physical properties of the granular parts was observed, when comparing the carbon fibrous structures to the precursors obtained in Synthetic Example 1 before the cutting process.

Figure 8:
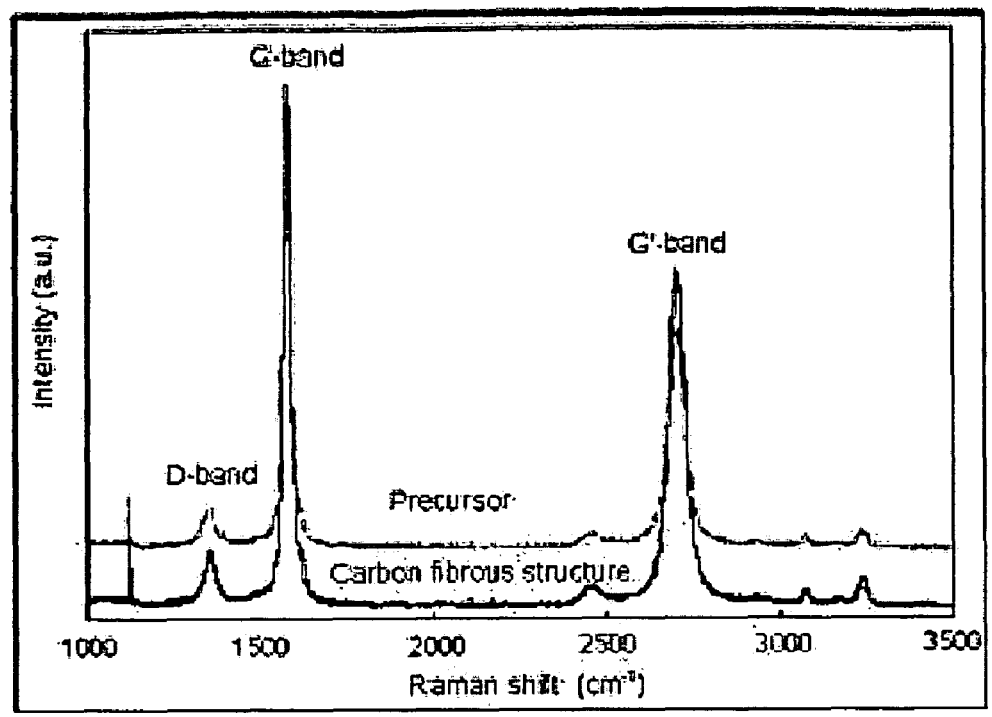

The measurement results of various physical properties of the carbon fibrous structure obtained in Example 1 are summarized in FIG. 5. Further, X-ray diffraction analysis and Raman spectroscopic analysis were performed on the carbon fibrous structures in order to investigate the changes in these analyses. The results are shown in FIG. 7 and FIG. 8, respectively. From the result of the Raman spectroscopic analysis, a slight increment trend in the amount of the defects was detected in the data of the carbon fibrous structure as compared with that of the precursor. This is due to the existence of the opened shapes' end portions of the fine carbon fibers in the carbon fibrous structure, wherein the opened ends are created by the cutting process and they are recognized as defect portions on this analysis. However, since the opened end would be created at the position where the defect existed inherently in the carbon fiber part in the precursor, a great increment trend in the amount of the defects were not derived. In the end, a Raman $I_D/I_G$ ratio and a Raman $I_{G'}/I_G$ ratio from which high strength and high electrically conductivity were expected were detected, and thus, it was shown that the number of defects in the graphene sheets was low.

In addition, the G' band showed a almost bilateral symmetry shape, and thus, it was suggested that the graphene sheets took cylindrical shapes.

Furthermore, from the observation in TEM, it was confirmed that the graphene sheets which constituted the fine carbon fibers were almost symmetric with respect to the central axis.

Additionally, it was found that the carbon fibrous structures after drying had a bulk density of 0.0352 g/cm³, Raman $I_D/I_G$ ratio of 0.088, Raman $I_{G'}/I_G$ ratio of 0.576, TG combustion temperature of 798° C., spacing of 3.385 angstroms, particle's resistance of 0.0185 Ω·cm, and density after decompression of 0.17 g/cm³.

Example 2

Under the same conditions as in Example 1 except that the irradiation time of the ultrasonic waves was changed to 1000 minutes, the precursors prepared in Synthetic Example 1 underwent the process of cutting selectively in order to prepare the carbon fiber structures. The obtained carbon fiber structures underwent the same evaluation tests as in Example 1. From the result of the observation using an optical microscope and a TEM, it was found that the obtained carbon fibrous structure possessed a form in which plural number of fine carbon fibers were extended outwardly from a granular part which located at the central potion of the structure, as is the case with Example 1.

The result of the examination for the distribution of the length of the fine carbon fibers in the obtained carbon fibrous structures is shown in Table 3, and the result of the examination for the distribution of the particle size of the granular parts is shown in Table 4.

The mean length of the fine carbon fibers in the precursor of Synthetic Example 1 before the process of cutting selectively was 10.21 μm, while the mean length of the fine carbon fibers in the carbon fibrous structure after the ultrasonic wave irradiation was stated was found to be 5.87 μm, which value was about half the value of the precursor. This result showed that many breakages were given in the fine carbon fibers of the precursors by the process of cutting selectively using the ultrasonic wave irradiation.

However, when comparing the mean particle size of the granular parts of the carbon fibrous structures after 1000 minutes' ultrasonic waves irradiation to that of the granular parts of precursors, the sizes were found to be about 0.3 μm in both cases, and thus, no variability was observed in the mean particle size of the granular parts before and after the ultrasonic wave irradiation. Considering measurement error, etc., it was found that the granular parts themselves were hardly destroyed even under the load condition that many breakages were given in the fine carbon, and the granular parts still function as the binding site for the fibers mutually.

Optical micrographs and TEM photos of the carbon fibrous structures obtained in Example 2 are much the same with those of the carbon fibrous structure obtained in Example 1 which are shown in FIG. 1A, FIG. 1B, FIG. 1C, FIG. 2A, FIG. 2B, FIG. 2C and FIG. 2D. Thus, it was found that the obtained carbon fibrous structure possessed a form in which plural number of fine carbon fibers were extended outwardly from a granular part which located at the central potion of the structure.

The measurement results of various physical properties of the carbon fibrous structure obtained in Example 2 are summarized in FIG. 5. Although the irradiation time of the ultrasonic waves in Example 2 was set to be 1000 minutes which was twice as much as 500 minutes in Example 1, this increment in the ultrasonic waves irradiation time were accompanied by no change in various physical properties shown in Table 5. Further, X-ray diffraction analysis and Raman spectroscopic analysis were performed on the carbon fibrous structures in order to investigate the changes in these analyses. The results are much the same with the results shown in FIG. 7 and FIG. 8.

Further, it was found that the obtained carbon fibrous structures had a bulk density of 0.0328 g/cm$^3$, Raman $I_D/I_G$ ratio of 0.079, Raman $I_{G'}/I_G$ ratio of 0.614, TG combustion temperature of 781° C., spacing of 3.386 angstroms, particle's resistance of 0.0219 Ω·cm, and density after decompression of 0.160 g/cm$^3$.

Additionally, it was found that the granular parts in the carbon fibrous structures had the mean particle size of 0.295 μm, that was 4.9 times larger than the mean outer diameter of the carbon fibers in the carbon fibrous structures. The mean roundness of the granular parts was found to be 0.82. Therefore, no substantial change in the physical properties of the granular parts was observed, when comparing the carbon fibrous structures to the precursors obtained in Synthetic Example 1 before the cutting process.

Example 3

Under the same conditions as in Example 2 except that the precursors prepared in Synthetic Example 2 were used, the process of cutting selectively by the ultrasonic waves irradiation for 1000 minutes was performed. The obtained carbon fiber structures underwent the same evaluation tests as in Example 1. From the result of the observation using an optical microscope and a TEM, it was found that the obtained carbon fibrous structure possessed a form in which plural number of fine carbon fibers were extended outwardly from a granular part which located at the central potion of the structure, as is the case with Example 1.

The result of the examination for the distribution of the length of the fine carbon fibers in the obtained carbon fibrous structures is shown in Table 3, and the result of the examination for the distribution of the particle size of the granular parts is shown in Table 4.

TABLE 3

| Distribution of the length of fine carbon fibers (pieces) | Example 1 (Carbon fibrous structure) | Example 2 (Carbon fibrous structure) | Example 3 (Carbon fibrous structure) |
| --- | --- | --- | --- |
| <1 μm | 17 | 24 | 7 |
| 1 μm to <5 μm | 128 | 104 | 105 |
| 5 μm to <10 μm | 29 | 42 | 61 |
| 10 μm to <15 μm | 15 | 17 | 19 |
| 15 μm to <20 μm | 9 | 8 | 3 |
| 20 μm to <25 μm | 1 | 5 | 3 |
| 25 μm to <30 μm | 1 | 0 | 2 |
| 35 μm to <40 μm | 0 | 0 | 0 |
| ≧40 μm | 0 | 0 | 0 |
| Mean length of fine carbon fibers | 4.95 μm | 5.87 μm | 4.20 μm |

TABLE 4

| Distribution of the particle size of granular parts (pieces) | Example 1 (Carbon fibrous structure) | Example 2 (Carbon fibrous structure) | Example 3 (Carbon fibrous structure) |
| --- | --- | --- | --- |
| <0.1 μm | 0 | 0 | 0 |
| 0.1 μm to <0.2 μm | 8 | 6 | 20 |
| 0.2 μm to <0.3 μm | 85 | 106 | 93 |
| 0.3 μm to <0.4 μm | 75 | 82 | 50 |
| 0.4 μm to <0.5 μm | 19 | 0 | 13 |
| 0.5 μm to <0.6 μm | 2 | 6 | 10 |
| 0.6 μm to <0.7 μm | 4 | 0 | 13 |
| ≧0.8 μm | 7 | 0 | 1 |
| Mean particle size of granular parts | 0.304 μm | 0.295 μm | 0.296 μm |

The mean length of the fine carbon fibers in the precursor of Synthetic Example 2 before the process of cutting selectively was found to be 10.03 μm, while the mean length of the fine carbon fibers in the carbon fibrous structure after the ultrasonic wave irradiation was stated was found to be 4.20 μm, which value was about half the value of the precursor. This result showed that many breakages were given in the fine carbon fibers of the precursors by the process of cutting selectively using the ultrasonic wave irradiation.

However, when comparing the mean particle size of the granular parts of the carbon fibrous structures after 1000 minutes' ultrasonic waves irradiation to that of the granular parts of precursors, the sizes were found to be about 0.3 μm in both cases, and thus, no variability was observed in the mean particle size of the granular parts before and after the ultrasonic wave irradiation. Considering measurement error, etc., it was found that the granular parts themselves were hardly destroyed even under the load condition that many breakages were given in the fine carbon, and the granular parts still function as the binding site for the fibers mutually.

Optical micrographs and TEM photos of the carbon fibrous structures obtained in Example 3 are much the same with those of the carbon fibrous structure obtained in Example 1 which are shown in FIG. 1A, FIG. 1B, FIG. 1C, FIG. 2A, FIG. 2B, FIG. 2C and FIG. 2D. Thus, it was found that the obtained carbon fibrous structure possessed a form in which plural number of fine carbon fibers were extended outwardly from a granular part which located at the central potion of the structure. Further, X-ray diffraction analysis and Raman spectroscopic analysis were performed on the carbon fibrous structures in order to investigate the changes in these analyses. The results are much the same with the results shown in FIG. 7 and FIG. 8.

The measurement results of various physical properties of the carbon fibrous structure obtained in Example 3 are summarized in FIG. 5.

Coating compositions thus obtained were developed individually on a glass plate in order to obtain hardened coated films of respective thicknesses shown in Table 6. The hardened films were tested for total light transmittance, and surface resistivity. The obtained results are shown in Table 6. Incidentally, the coating abilities of the coating compositions were good and the compositions can be coated by a bar coater with ease.

TABLE 5

| Items | Synthetic Example 1 (Precursor) | Synthetic Example 2 (Precursor) | Example 1 (Carbon fibrous structure) | Example 2 (Carbon fibrous structure) | Example 3 (Carbon fibrous structure) |
|---|---|---|---|---|---|
| Area based circle-equivalent mean diameter (µm) | 70.3 | 67.3 | — | — | — |
| Mean particle size of granular parts (µm) | 0.289 | 0.309 | 0.304 | 0.295 | 0.296 |
| Mean roundness of granular parts | 0.81 | 0.78 | 0.84 | 0.82 | 0.80 |
| Mean length of fine carbon fibers in precursor (µm) | 10.21 | 10.03 | — | — | — |
| Mean length of fine carbon fibers in carbon fibrous structure | — | — | 4.95 | 5.87 | 4.2 |
| Ratio of mean particle diameter of granular parts and mean diameter of fine carbon fibers | 4.8 | 5.2 | 5.1 | 4.9 | 4.9 |
| Bulk density (g/cm$^3$) | 0.0042 | 0.0055 | 0.0352 | 0.0328 | 0.0382 |
| $I_D/I_G$ ratio | 0.083 | 0.074 | 0.088 | 0.079 | 0.091 |
| $I_{G'}/I_G$ ratio | 0.642 | 0.528 | 0.576 | 0.614 | 0.544 |
| TG combustion temperature (° C.) | 768 | 802 | 798 | 781 | 775 |
| Spacing for (002) faces (Å) | 3.383 | 3.386 | 3.385 | 3.386 | 3.388 |
| Particle's resistance at 0.5 g/cm$^3$ (Ω·cm) | 0.0172 | 0.0193 | 0.0682 | 0.0734 | 0.1473 |
| Particle's resistance at 0.8 g/cm$^3$ (Ω·cm) | 0.0094 | 0.0109 | 0.0229 | 0.0276 | 0.0468 |
| Particle's resistance at 0.9 g/cm$^3$ (Ω·cm) | 0.0082 | 0.0095 | 0.0185 | 0.0219 | 0.0369 |
| Density after decompression (g/cm$^3$) | 0.2 | 0.190 | 0.170 | 0.160 | 0.190 |

Further, it was found that the obtained carbon fibrous structures had a bulk density of 0.0382 g/cm$^3$, Raman $I_D/I_G$ ratio of 0.091, Raman $I_{G'}/I_G$ ratio of 0.544, TG combustion temperature of 775° C., spacing of 3.388 angstroms, particle's resistance of 0.0369 Ω·cm, and density after decompression of 0.190 g/cm$^3$.

Additionally, it was found that the granular parts in the carbon fibrous structures had the mean particle size of 0.296 µm, that was 4.9 times larger than the mean outer diameter of the carbon fibers in the carbon fibrous structures. The mean roundness of the granular parts was found to be 0.80. Therefore, no substantial change in the physical properties of the granular parts was observed, when comparing the carbon fibrous structures to the precursors obtained in Synthetic Example 2 before the cutting process.

Examples 4-6

To 100 parts by weight of polyurethane resin solution (non-volatile moiety: 20%), the carbon fibrous structures obtained in Example 1 were added at respective ratios shown in Table 6. As results, the coating compositions where the carbon fibrous structures were dispersed in the polyurethane resin solution were prepared.

TABLE 6

| | Example 4 | Example 5 | Example 6 | Control 1 | Control 2 |
|---|---|---|---|---|---|
| Polyurethane resin | 100 | 100 | 100 | 100 | 100 |
| Carbon fibrous structure | 5 | 2 | 5 | — | — |
| multi-layered carbon nanotube | — | — | — | 1.5 | 5 |
| Film thickness (µm) | 0.2 | 1 | 1.5 | 1 | 1 |
| Total light transmittance (%) | 88.2 | 87.3 | 71.7 | 22.7 | N.D. |
| Surface resistivity (Ω/cm$^2$) | 3.8 × 10$^8$ | 3.6 × 10$^8$ | 4.9 × 10$^8$ | >10$^{12}$ | >10$^{12}$ |

Example 7

In order to observe the presence and dispersion condition of the carbon fibrous structures in the matrix, a polyurethane coated film (about 500 nm in thickness) were formed so that the film contained the carbon fibrous structures obtained in Example 1 at a ratio of 0.2% by weight based on the total weight.

Figure 9:
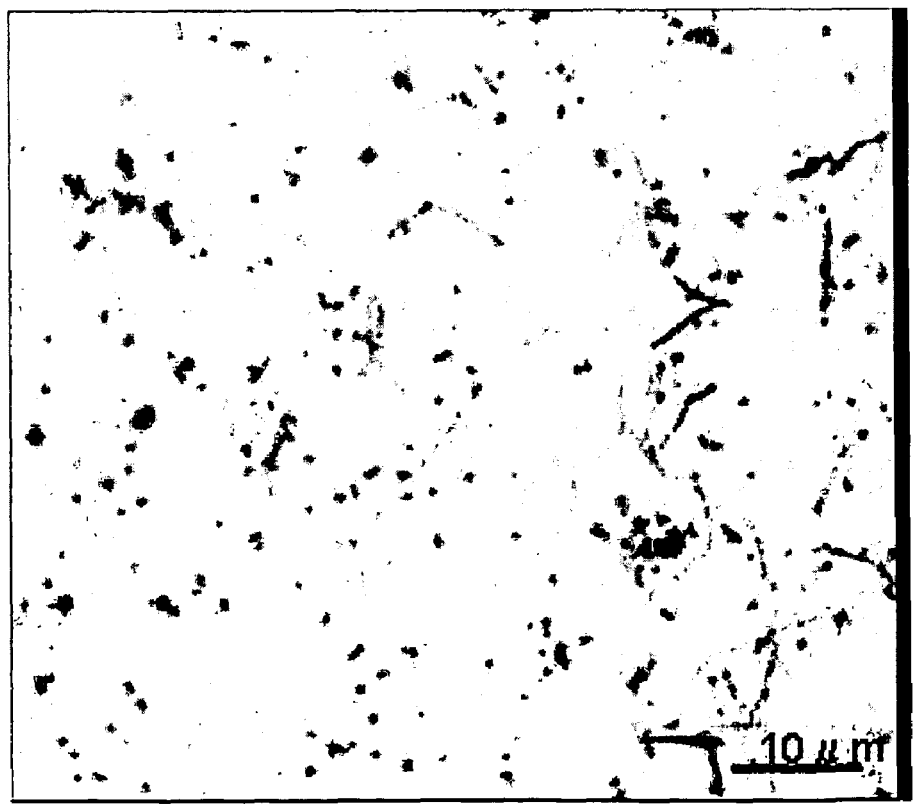

Optical micrograph of the coated film is shown in FIG. 9. It is apparent from FIG. 9 that the carbon fibrous structure showed a good dispersibility in the resin matrix.

(Controls 1 and 2)

To 100 parts by weight of polyurethane resin solution (non-volatile moiety: 20%), multilayered carbon nanotubes (manufactured by Tsinghua-Nafine, outside diameter: 10-20 nm, length: several micrometers to several ten micrometers) was added at respective ratios shown in Table 6. As results, the coating compositions where the multilayered carbon nanotubes were dispersed in the polyurethane resin solution were prepared.

Coating compositions thus obtained were developed individually on a glass plate in order to obtain hardened coated films of respective thicknesses shown in Table 6. The hardened films were tested for total light transmittance, and surface resistivity. The obtained results are shown in Table 6. Incidentally, the coating abilities of the coating compositions were good and the compositions can be coated by a bar coater with ease.

The invention claimed is:

1. Carbon fibrous structure which comprises a granular part and 2-20 pieces of carbon fibers each of which has an outside diameter of 15-100 nm and which are extend outwardly from the granular part, wherein the granular part is produced in a growth process of the carbon fibers, wherein the size of granular part is 1.3 or more of times larger than the outside diameter of the carbon fibers, and wherein the mean length of the carbon fibers is not more than 20 µm.

2. The carbon fibrous structure according to claim 1, wherein the carbon fibrous structure which has a bulk density of 0.0001-0.05 g/cm$^3$.

3. The carbon fibrous structure according to claim 1, wherein the carbon fibrous structure has an $I_D/I_G$ ratio of not more than 0.2, and an $I_{G'}/I_G$ ratio of 0.6-1.2, which are determined by Raman spectroscopy.

4. The carbon fibrous structure according to claim 1, wherein the carbon fibrous structure has a combustion initiation temperature in air of not less than 700° C.

5. The carbon fibrous structure according to claim 1, wherein the carbon fibrous structure is produced using as carbon sources at least two carbon compounds which have different decomposition temperatures.

6. The carbon fibrous structure according to claim 1, wherein the carbon fibrous structure is produced by creating a turbulent flow in a catalyst included raw material gas in a temperature range of 400-1000° C.

7. The carbon fibrous structure according to claim 1, wherein the carbon fibrous structure is obtained by using as a precursor a carbon fibrous structure which comprises a three dimensional network of carbon fibers each having an outside diameter of 15-100 nm, and cutting the carbon fibers of the precursor at defect portions of the carbon fibers.

* * * * *